April 19, 1949.   R. L. WATHEN   2,467,412
NAVIGATION INSTRUMENT
Filed June 9, 1944   2 Sheets-Sheet 2
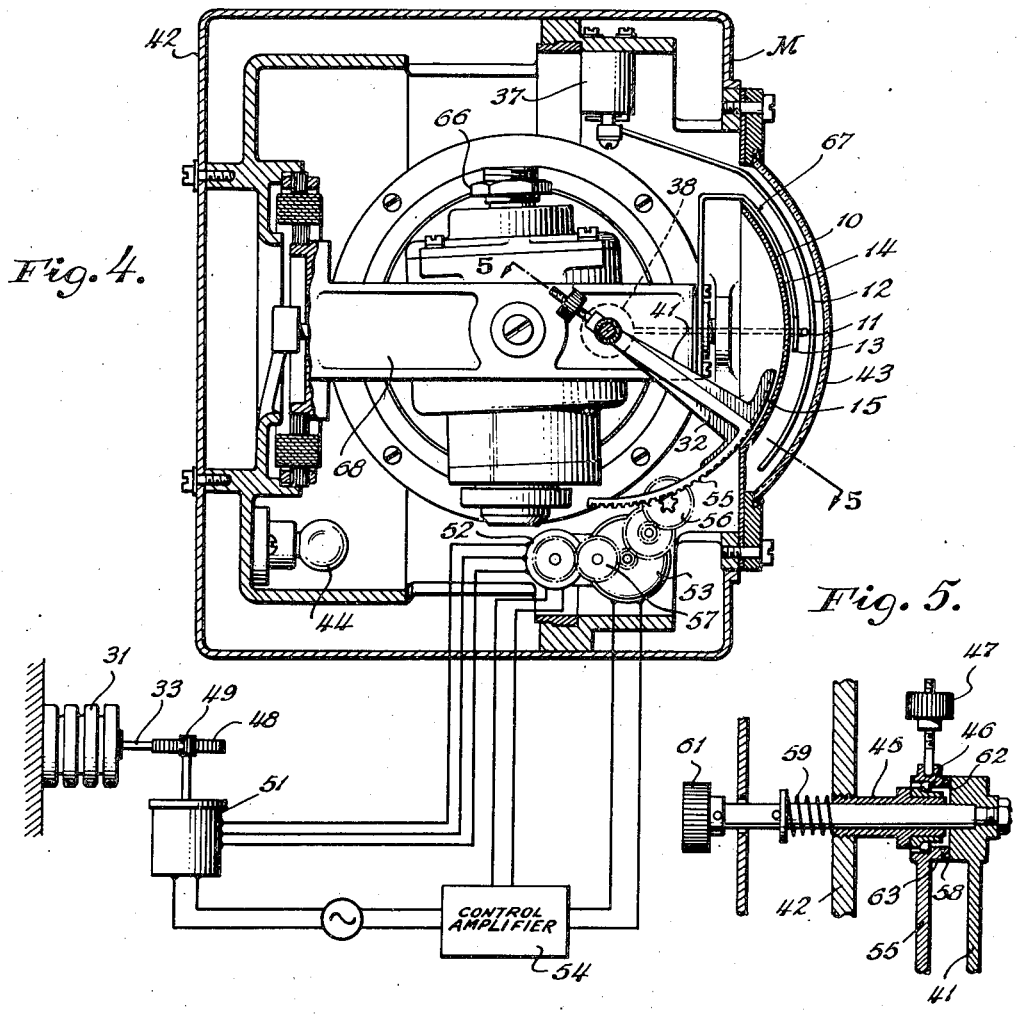
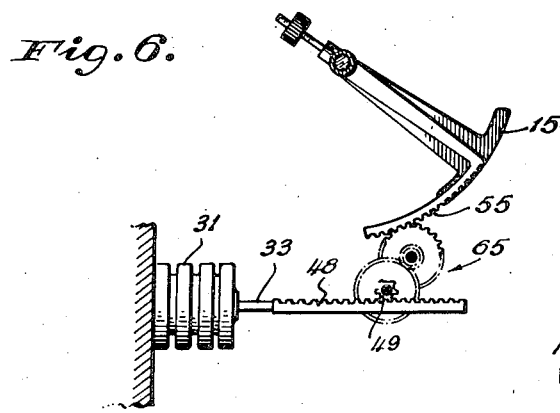
INVENTOR
ROBERT L. WATHEN
BY
ATTORNEY Patented Apr. 19, 1949

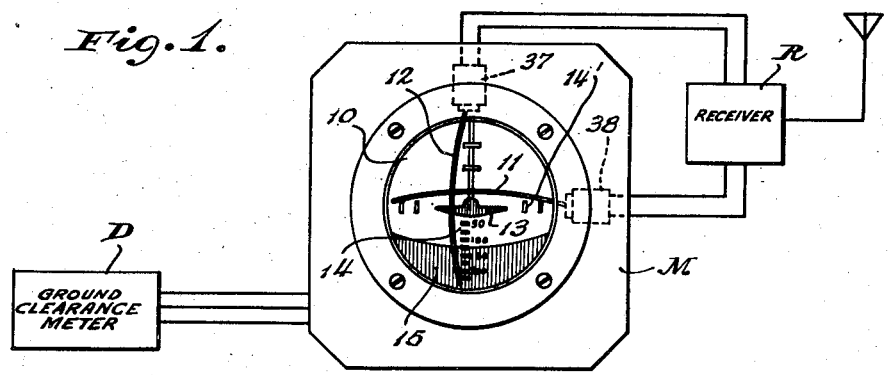

2,467,412

UNITED STATES PATENT OFFICE 2,467,412

NAVIGATION INSTRUMENT

Robert L. Wathen, Hempstead, N. Y., assignor to The Sperry Corporation, a corporation of Delaware Application June 9, 1944, Serial No. 539,403

6 Claims. (Cl. 171—95)

This invention relates to navigation instruments and more particularly, to an instrument for assisting an aircraft pilot in making instrument landings.

It is customary when navigating a craft, to employ electromagnetic means for defining a path or route over which the craft is to travel, and to provide the pilot with visual means for denoting the relation of the craft to the predetermined path. Although various types of electromagnetic systems may be employed for describing the desired path, based on the directional characteristics or the propagation rate of electromagnetic energy, the present invention is herein described as applied to a conventional equi-signal system of directive radiation, and specifically to such a system having beams overlapping in a vertical plane for defining a glide path useful in conjunction with instrument landing operations.

As is well known, equi-signal systems utilize intermittently energized and distinctively modulated and partially overlapping lobes of electromagnetic energy, the axis of which defines an equi-signal locus or path along which the craft is to travel. A zero center type meter is energized in opposition by signals derived from the respective lobes, the meter providing a neutral indication when the signals are balanced, to denote that the craft is properly on course. Deviation of the craft from its course, unbalances the derived signals and produces a meter reading ordinarily proportional to the deviation angle, representing the difference between the instantaneous bearing of the transmitting station and the heading of the equi-signal locus. By the use of specially designed automatic volume control (A. V. C.) circuits, it has been found possible to indicate craft displacement substantially in terms of linear transverse departure, irrespective of the distance between the craft and the transmitting station. Since the displacement reading ordinarily is a function of the deviation angle, and the deviation angle in turn varies for a given linear displacement from course as a function of the distance from the transmitting station it was found that to produce a reading of linear displacement required the use of over-compensated or forward-acting A. V. C. circuits, to decrease the strength of the output signals as the carrier strength increases.

The present invention has for its principal purpose to provide the pilot of a craft with an indication not only of his relation to a predetermined path or course, but to combine such an indication with a reading of his relation to an independent reference, typically a reference surface such as the ground at sea level, the projected elevation of a landing path or the subjacent terrain. If the indicator or meter is calibrated in linear units as previously described, in order to denote actual linear displacement from the chosen path, the same meter may be utilized to denote linear displacement from the chosen reference surface. More specifically, if the indicator is calibrated to denote roughtly the distance of an aircraft above or below a glide path, such an instrument may be utilized to denote some function of the aircraft's altitude as ground clearance or barometrically-determined altitude.

The principal objects of the present invention are to provide a navigation instrument indicating displacement of a craft from a predetermined path and from an arbitrarily chosen reference; to provide a navigation instrument denoting in substantially linear units displacement of the craft from a predetermined path and from a reference surface; to provide an improved instrument landing meter indicating displacement from the landing path and an altitude function such as ground clearance; to provide an improved cross pointer meter having a vertical scale in linear units for denoting vertical displacement of an aircraft from a glide path, and also for indicating the instantaneous altitude of the aircraft; to provide in an instrument landing meter an indication of ground clearance with the ground represented by a movable mask member; to provide in a navigation instrument an indication of linear displacement of the craft from course, with an index simulating the craft, drawn to the scale defined by the linear units. These and other objects will become more fully apparent from the following description and from the accompanying drawings.

In the drawings,

Fig. 1 is a diagrammatic view of a navigation instrument such as a cross pointer meter together with receiving equipment, adapting the meter to indicate displacement of the craft from a landing path, and ground clearance;

Fig. 2 is a block diagram of the system shown in Fig. 1, the components of the receiver being shown in greater detail;

Fig. 3 is a diagrammatic view of one form of ground clearance or altitude control;

Fig. 4 is a vertical cross sectional view through one form of meter wherein gyroscopic stabilization is included;

Fig. 5 is a detailed sectional view taken along the line 5—5 of Fig. 4; and

Fig. 6 is a diagrammatic view of a modified form of ground clearance or altitude indication control.

Generally speaking, the invention comprehends providing an indication of displacement of a craft from a predetermined path in linear scale units, and providing on the scale an indication of craft displacement from an independent reference line or surface such as the subjacent terrain or the projected sea level. The principles of the invention are applicable generally to all sorts of dirigible craft being guided along an electromagnetically or otherwise defined path. Although the invention is in nowise thus limited, to simplify the illustration, it is herein disclosed as specifically applied to an equi-signal type instrument landing system.

As shown in Fig. 1, use may be made of a receiver responsive to some characteristic of the electromagnetic energy defining the predetermined direction of travel, for deriving therefrom signals representative of displacement of the craft from the path, and a meter or indicator M provided with scale means for denoting the displacement of the craft, preferably in linear units. In the specified arrangement disclosed, the meter M comprises a conventional cross pointer meter, having a pair of crossed pointers 11 and 12 responsive to vertical and horizontal displacement signals, respectively, from the receiver. For indicating the actual displacement of the craft from the equi-signal locus as a function of the distance between the pointer intersection and a reference index member 13 representative of the craft, dial 10 is provided with suitable scales 14, 14' calibrated preferably in linear units. As applied to instrument landing, the scales may be calibrated to denote vertical and horizontal displacement respectively, with maximum displacement of the order of two hundred feet. If the index member 13 comprises a representation of the craft in which the receiver is mounted, and the scales are in linear units, it is proposed to make the representation roughly to scale, so that the pilot may judge his displacement more reliably, for example as a function of the wing span of the craft. A ground clearance meter or other distance measuring device D provides a signal representative of the distance between the craft and the ground or other reference. A mask member 15 coupled to altimeter controlled means 32 is responsive to the signals from the device D and cooperates with the scale 14 to provide the proper indication, as will more fully appear.

The apparatus of Fig. 2 discloses in block diagram form, a generally conventional superheterodyne receiver, having separate reception channels for the respective characteristically modulated components of the overlapping electromagnetic lobes defining the localizer and glide paths of an instrument landing system. The receiver comprises the usual preamplifier and converter 16, intermediate frequency amplifier 17, detector 18, and audio amplifier 19 for feeding the signals into band pass filters 21 and 22 where the respective modulation components are segregated for rectification by rectifiers 23 and 24 for comparison across an output resistor 25. The respective lobes for the glide path and localizer path may employ the same modulation frequencies, typically 600 and 900 cycles per second, to define the equi-signal locus. However, the carrier frequency for the lobes defining the glide path customarily is separated conveniently from the carrier frequency used for the lobes defining the localizer path. This provision, and the use of different intermediate frequencies, avoids interference between the separate channels of the receiver. An A. V. C. generator 26 derives energy from the incoming signals and develops a voltage characteristic of the carrier strength, which voltage is applied to the control elements of the intermediate amplifiers in a conventional manner. It has been determined recently, that if the A. V. C. voltage is applied additionally to a sufficient number of stages in the audio amplifier 19, that the output power may be made to vary as a decreasing function of the carrier strength. It will be apparent that the over-correction of output power may be sufficient to transform the meter readings from the usual angular displacement indications to the more convenient linear displacement indications. This expedient is obtained by varying the receiver gain as the square of the distance between transmitter and receiver, a condition that has been closely approximated in practice. Accordingly, at any distance from the transmitting station, the pilot may determine the corrective motions required to restore the craft to its course, according to the location of the pointer intersection relative to the index 13, and the amount of correction required may be judged from the horizontal and vertical distance between the intersection and the index member 13 as determined by the scales 14, 14'.

Either or both the horizontal or vertical displacement calibrations of the scales 14, 14' may be utilized to indicate distance of the craft from a reference point line or surface. Thus the vertical scale denoting displacement from the glide path, may be utilized to denote ground clearance or altitude. A simple arrangement for producing this result is disclosed in Fig. 3 and comprises an altitude sensitive device, such as an evacuated Sylphon bellows 31 functioning as an aneroid barometer to denote altitude as a function of barometric pressure. Although the bellows motion may be used directly through a mechanical linkage to denote altitude as indicated in Fig. 6, as will appear, it may be desirable to minimize frictional error by utilizing some simple servo mechanism. Such a device, as shown in Fig. 3 may comprise an indicator 32, electrically controlled in response to axial motion of the stem 33 of the bellows 31. The stem 33 may actuate the movable arm 34 of a variable resistor or other suitable control element 35 capable of regulating electrical energy applied to the indicator 32 from a power source such as battery 36. The type of indicator 32 employed may vary widely, and depends in some measure on the nature of the meter M. It has been common practice to utilize a cathode ray tube in the meter M to form images on the scale thereof displaced from a reference mark or index as a function of the signals derived by the receiver. More customarily, however, the meter M utilizes movable pointers 11 and 12 actuated by separate meter movement assemblies 37 and 38. Similarly with the indicator 32, use may be made of electrostatic deflection in a cathode ray tube meter, or as indicated of a D'Arsonval movement 39, the current to which flows from the source 36 in accordance with the position of the arm 34. The movable element of the indicator 32 may comprise a conventional pointer or arm 41 cooperative with the scale 14 to denote altitude or ground clearance. Preferably, however, the mask member 15 is attached to the arm 41 to provide a more realistic representation of the ground when the indicator 32 is adapted to that specific purpose. The mask member conveniently comprises a sheet of colored transparent material, through which the numbers of the scales 14, 14' may be discerned and movable in front of the dial 10, as shown in Fig. 1. The dial 10, upon which scales 14, 14' are formed, conventionally is made convex and the pointers 11 and 12 are similarly curved to provide substantially perpendicular pointer intersection. The mask member 15 likewise may be shaped to conform to the curved surface of the dial.

The structural relationship between the parts is most clearly shown in Fig. 4. The meter M is shown enclosed in a suitable casing 42 adapted for mounting in the instrument panel of an airplane or other dirigible craft. The front of the casing is provided with a circular opening protected by a lens or cover 43 of glass or other transparent material through which the scales 14, 14', mask 15 and pointers 11 and 12 are visible. The meter movement assemblies 37 and 38 may be supported by the casing 42 with axes disposed along perpendicular diameters of the spherical shell segment defined by the curved dial 10.

The mask member 15 may be supported as shown in Fig. 4 for movement behind a transparent dial 10, and the interior of the casing 42 may be illuminated by a small lamp 44. Likewise, any or all of the elements comprising the pointers 11 and 12 and index member 13 may be transparent and may be mounted in front or behind the dial 10, as desired. The arm 41 is pivoted to the casing 42 as shown in Fig. 5, as by means of sleeve 45 extending inwardly from the casing. A ball-bearing 46, and an adjustable counterbalance 47 may be employed to render the ground clearance or altitude indicator more sensitive.

Convenient mechanism is employed to operate the mask member 15 in response to a control device such as bellows 31. In the arrangement shown in Fig. 4, the motion of the stem 33 in response to altitude changes may be transmitted to the indicator 32 through a rack 48 and pinion 49, through a suitable servo mechanism preferably including a self-synchronous transmitter 51 and receiver 52, having a servo motor 53 responsive to phase sensitive amplifier 54. A gear sector 55, pivotable with the arm 41 is moved by the motor 53 through a suitable gear train 56. A followback, such as a gear 57, erases the motor-driving signal when the transmitter 51 and receiver 52 are electrically aligned. It will be apparent from the foregoing, that a change in altitude produces an axial motion of stem 33, causing a signal to be generated by the transmitter 51 for operating motor 53 to bring the receiver 52 into alignment. The resultant motion of sector 55 is imparted to the arm 41 through a clutch 58, as will appear, to provide the proper altitude indication.

It is desirable to adjust the mask member 15 of indicator 32 relative to the scale 14, both when initially calibrating the instrument, and when readjusting, (e. g.) so as to compensate for varying barometric pressures. A simple manual adjustment is shown in Fig. 5 and comprises a friction clutch 58, normally loaded by a compression spring 59 so as to hold the hub 62 of arm 41 against the hub 63 of gear sector 55. An adjustment knob 61 extends through the sleeve 45 and is attached securely to the hub 62. By depressing the knob 61, the clutch 58 is disengaged and by rotating the knob, the mask member 15 may be shifted to any desired position on the scale. The pilot may thus compare the altitude or ground clearance indication with a known proper altitude of the craft, e. g., at the moment the usual marker beacon signals are received. Thus, when the pilot receives the outer marker beacon signal, he may make any necessary adjustment of the altitude indicator by moving mask member 15. The altitude reading then may be checked when the inner marker beacon signal is received. A similar manual control element 64 is shown in Fig. 3 and comprises merely a variable resistor in series with the resistor 35 and the source 36.

Fig. 6 discloses a simple mechanical control of the mask member 15 in response to axial movement of the stem 33 that may be employed where frictional losses are small, and comprises merely step-up gearing 65, interconnecting sector 55 and rack 48. With such an arrangement, a slight motion of the stem 33 produces an appreciable motion of the gear sector 55.

As shown in Fig. 4, a gyro vertical 66 may be used to stabilize the instrument about the craft roll axis. Although the scales 14, 14', pointers 11 and 12 and mask 15 may be stabilized against rolling motion of the craft, and the banking angle may be denoted by reference to permanently mounted index member 13, it is preferred for purposes of the present disclosure to mount the index member 13 on to the gyro vertical for stabilization about the roll axis and to denote the banking angle by reference to the scale 14, pointer assembly and mask member 15 which tilt with the craft. As shown in Fig. 4, the index member 13 is supported in the center of the scale 14 by a slender rod 67, preferably transparent, extending over the top of the dial 10 for mounting on gimbal ring 68 of gyro vertical 66. Accordingly, as the craft banks, the index member 13 appears to the pilot as though it tilted, and the amount of the apparent tilt corresponds to the banking angle of the craft. The pilot thus is able, by observing a single instrument, to be continuously and fully informed as to the position of the craft relative to the desired path, as to any abnormal banking angle that might render a normal landing difficult and as to the position of the ground with respect to the plane. The craft approaches the landing strip by proceeding along the glide path. Beyond a predetermined altitude established by the full scale displacement reading of meter M, the mask member 15 progressively rises over the scale 14 informing the pilot that he is nearing the landing point, thereby allowing him to take whatever appropriate measures are required during the landing operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An aircraft instrument for indicating the aircraft position relative to a predetermined glide path and to the ground, comprising a first movable indicating element, means for varying the height of said first indicating element above or below a reference position in said instrument according to the displacement of the aircraft position below or above the predetermined flight path, a second indicating element, and means for varying the height of said second indicating element beneath said reference position according to the proximity of the aircraft position to the ground level, said means for controlling the height of said first indicating element being so arranged that said first indicating element occupies the reference position when the aircraft position is on said path and said means for controlling the height of said second indicating element being so arranged that said second indicating element rises to said reference position as the position descends to the ground level, whereby the distance of said reference position above said second indicating element represents the height of the aircraft position above the ground and the distance of said first indicating element above said second indicating element represents the height of said path above the ground and the positional relation of said reference position with both said indicating elements therefore represents the simultaneous positional relation of the aircraft with the ground and the path.

2. Aircraft guidance apparatus as defined in claim 1, wherein said second indicating element presents a substantially horizontal portion indicating the generally level ground surface, said apparatus further including means for stabilizing said second indicating element against the roll of the aircraft, whereby said second indicating element realistically indicates the height and general orientation of the ground beneath the aircraft.

3. An aircraft instrument for cooperating with an instrument landing glide path receiver and for indicating the craft position in reliance upon the output of the receiver, the instrument comprising a frame, first indicating element movably supported in said frame, voltage responsive mechanism coupled to said indicating element and adapted to vary the height thereof in said frame according to the instrument landing glide path receiver output voltage to represent the vertical displacement of an instrument landing glide path from the aircraft position, a second indicating element arranged to represent the ground surface area generally below and ahead of the aircraft, and means connected to said second indicating element for varying the height thereof inversely according to the height of the craft position above the ground, whereby said apparatus is capable of presenting to the pilot of the aircraft a fully correlated pattern scalarly showing the relative positions of the ground surface, the aircraft and the glide path in such a natural arrangement that the pilot is enabled to rely fully and solely upon this apparatus not only for travelling along the glide path but also for guarding against unexpected contact with the ground.

4. Apparatus as defined in claim 3 further including means for stabilizing said further indicating element about an axis parallel to the roll axis of the aircraft.

5. A craft guidance instrument comprising a housing, first and second crossed indicating members movable in said housing, means for deflecting said members in such a way as to provide for universal movement of their point of intersection throughout a zone of appreciable area, a mask movably supported in said housing and having a border movable in close adjacency to said zone, and means for providing translational movement of said mask relative to said crossed members for indicating a limitation of the safe range of craft navigation.

6. A craft guidance instrument comprising a housing, first and second crossed indicating members movable in said housing, said members having arcuate visible portions and being pivoted about substantially intersecting and substantially perpendicular axes, the region of intersection of the pivotal axes being in the vicinity of the centers of curvature of said arcuate portions, and a mask formed substantially according to the surface of a spherical section, said mask being pivoted for movement about an axis substantially in the plane of said pivotal axes and passing substantially through said region of intersection of said pivotal axes, the radius of said mask and the radii of said arcuate portions being of the same order of magnitude.

ROBERT L. WATHEN.

REFERENCES CITED

The following references are of record in the file of this patent:

UNITED STATES PATENTS

| Number | Name | Date |
|---|---|---|
| 791,785 | Hertzberg et al. | June 6, 1905 |
| 840,569 | Lea | Jan. 8, 1907 |
| 1,275,786 | Stuart | Aug. 13, 1918 |
| 1,981,589 | Dunmore | Nov. 20, 1934 |
| 1,991,892 | Fessenden | Feb. 19, 1935 |
| 1,999,047 | Hahnemann | Apr. 23, 1935 |
| 2,225,046 | Hunter | Dec. 17, 1940 |
| 2,226,930 | Hefele | Dec. 31, 1940 |
| 2,235,390 | Smith | Mar. 18, 1941 |
| 2,262,245 | Moseley et al. | Nov. 11, 1941 |
| 2,264,063 | Bond | Nov. 25, 1941 |

FOREIGN PATENTS

| Number | Country | Date |
|---|---|---|
| 538,214 | Great Britain | July 24, 1941 |

Certificate of Correction

Patent No. 2,467,412 April 19, 1949

ROBERT L. WATHEN

It is hereby certified that error appears in the printed specification of the above numbered patent requiring correction as follows:

Column 7, line 11, before the word "position", second occurrence, insert *aircraft*; and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*